Nov. 25, 1930.  C. W. ROBINSON  1,782,583
GRAIN DRILL
Filed July 8, 1929  2 Sheets-Sheet 2
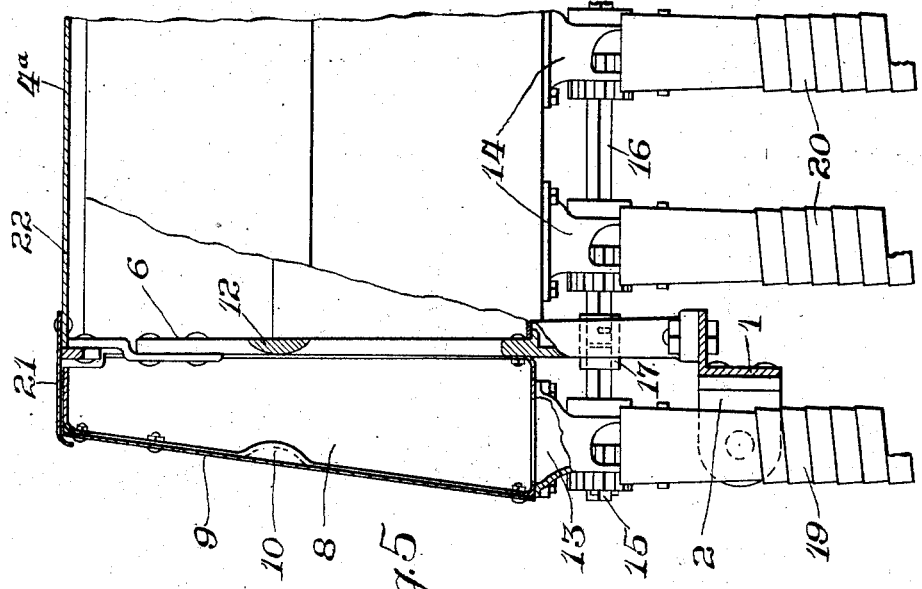
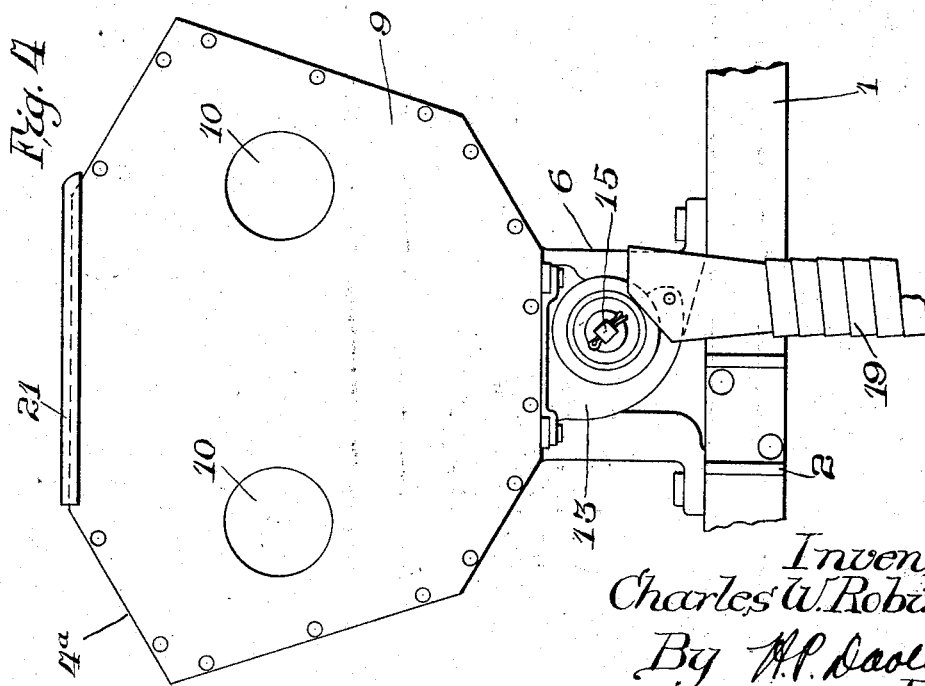
Inventor
Charles W. Robinson Patented Nov. 25, 1930

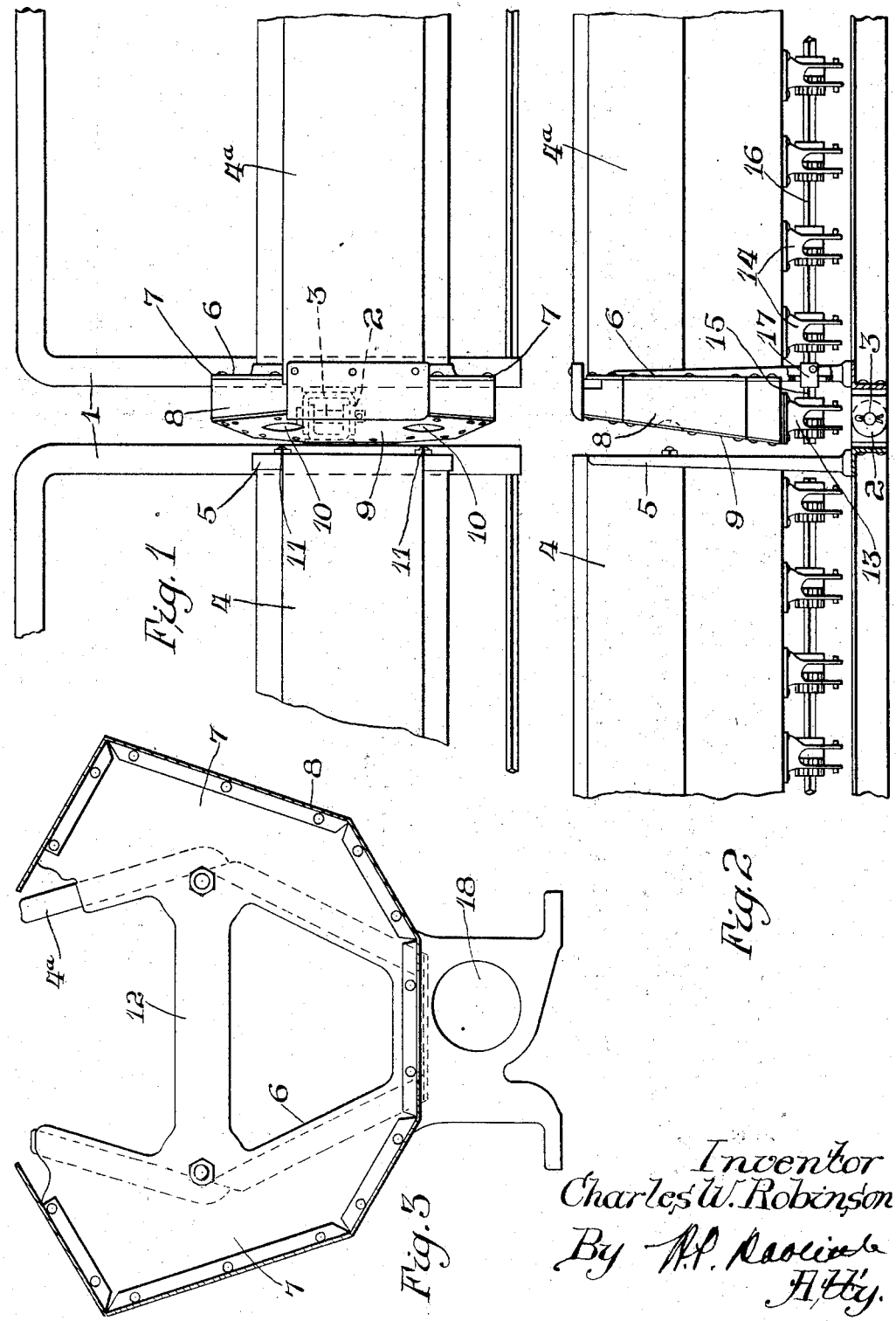

1,782,583

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

GRAIN DRILL

Application filed July 8, 1929. Serial No. 376,638.

This invention relates to grain drills and particularly to improvement in the structure of duplex grain drills.

The object is to provide a supplemental or extension drill unit to fill in the gap which would otherwise exist in the planted area when two independent grain drills are joined together end-to-end in spaced relationship to form a compound or duplex machine.

Another object is to position the extension drill unit between the adjacent end of two connected grain drills in such a manner that it will not interfere with the desired flexibility of the two drills with respect to each other.

Another object is to position the feed cup on the extension drill and its associated feeding mechanism so that it may be operated by a simple extension from the shaft which operates the seed cups on a main grain drill hopper.

Other objects will be apparent from the detailed description to follow.

In the drawings,—

Figure 1 is a plan view showing the extension drill of this invention in position on a duplex drill, and certain associated parts of said drill;

Figure 2 is a side elevation, partly in section, of the structure shown in Figure 1;

Figure 3 is a cross section through the extension feed box showing the special end member which supports the end of the drill hopper and serves as an attaching means for the extension feed box;

Figure 4 is an end view of the section of the duplex drill to which the extension is attached; and, Figure 5 is a side elevation of the structure shown in Figure 4 with the extension feed box shown in cross section.

The drawings show the extension or fill-in drill unit applied to a particlar duplex drill, which forms a part of the subject-matter of my copending application, Serial Number 377,997, filed July 13, 1929. Two main grain drill frames 1 are hinged end-to-end by brackets 2 and a pin 3 extending through aligned openings in the bracket. Grain hoppers 4 and 4ª are mounted on the frames with their ends spaced apart as shown in Figures 1 and 2. One hopper 4 is supported on the frame by a conventional end member 5. For the other hopper 4ª, to which the extension drill is attached, a special end and supporting member 6 is provided. The member 6 is suitably secured to the hopper 4ª and to the main frame 1. As shown in Figure 3, the sides 7 of the end member 6 extend beyond the sides of the hopper 4ª.

A sheet metal feed box 8 is secured to the end member 6. The feed box is constructed with the end wall 9 slanted upwardly away from the end of the adjacent hopper 4 and is provided with depressions 10 in alignment with the bolts 11 on the adjacent hopper. These depressions are provided to prevent injury to the seed box 8 in case the drills should be tipped until the end wall 9 contacts with the end member 5 on the adjacent hopper 4.

The member 6 with the exception of the bracing bar 12 extending across it provides free communication between the hopper 4ª and the feed box 8.

A seed cup 13 containing dispensing mechanism is attached to the bottom of the feed box 8 in alignment with spaced seed cups 14 on the hopper 4ª. A short shaft 15 is provided for driving the dispensing mechanism in the seed cup 13. The shaft 15 is of the same rectangular cross section as, and in alignment with, the shaft 16, which extends through and drives the dispensing mechanisms in the seed cups 14 on the main hopper. A sleeve 17 having the same rectangular cross section as the shafts 15 and 16 operatively connects the two shafts. An opening 18 is provided in the bottom of the end support 6 to permit free rotation of the shafts and of the sleeve 17.

A seed tube 19, similar to the seed tubes 20 on the main hopper, is attached to the seed cup 13 and extends downwardly between the ends of the frames 1. The hinge brackets 2 are so positioned on the frames, as shown in Figures 2 and 4, and space the frame such a distance apart that neither the hinge nor the ends of the frames interfere with the seed tube 19.

The seed box 8 is open at the top, and an extension 21 is rigidly secured to the hopper lid 22 to serve as a cover therefor.

It will be noted by an inspection of Figure 2 that when two implements, such as grain drills, are joined end-to-end, the dispensing mechanisms are so spaced apart that a gap would occur in the planted area. By utilizing the extension as shown and adding the auxiliary dispensing mechanism, such a gap is prevented and even spacing of the planting is obtained.

Although the invention has been illustrated in a particular form and as applied to a duplex implement of a particular construction, it will be understood that its use is contemplated wherever adaptable and applicant limits his claim to invention only by the scope of the appended claims.

What is claimed as new is:

1. An extension drill adapted to fill in between the ends of two grain drills pivotally joined end to end to form a duplex drill which comprises a feed box positioned between the adjacent ends of said drills and secured to the end of one drill, a seed cup attached to the feed box, and means for operating said seed cup.

2. An extension drill adapted to fill in between the ends of two grain drills pivotally joined end to end to form a duplex drill which comprises a feed box positioned between the adjacent ends of said drills and secured to the end of one drill, the wall of said feed box adjacent the end of the other drill being spaced and slanted upwardly away therefrom, a seed cup attached to the feed box, and means for operating said seed cup.

3. An extension drill for duplex drills consisting of two grain drills pivotally secured end to end with hoppers in spaced relationship which comprises a feed box positioned between the adjacent ends and secured to the end of one hopper, the feed box and the hopper to which it is secured being formed with a grain feed opening, a seed cup attached to the feed box, and means for operating the seed cup.

4. In a duplex drill, grain drills pivotally joined end to end in spaced relationship each of said drills having a hopper, seed cups and means for operating said cups, a fill-in drill adapted to be positioned between the ends of said drills comprising a feed box secured to the end of one of said hoppers and in communication therewith, a seed cup secured to said feed box, and means for operating said seed cup, said means being operatively connected to the means for operating the hopper seed cups.

5. The combination of a plurality of grain drills comprising aligned frames having a hinged connection at the adjacent ends, grain hoppers mounted on the frames and extending to the connected ends thereof, uniformly spaced seed dispensing units mounted below each hopper, a hopper extension on the end of one hopper overhanging the hinged connection between the frames, and a seed dispensing unit mounted on said extension in uniformly spaced relation to the units on the respective hoppers.

In testimony whereof I affix my signature.

CHARLES W. ROBINSON.